United States Patent
Capodivacca et al.

(10) Patent No.: US 7,342,385 B2
(45) Date of Patent: Mar. 11, 2008

(54) DRIVE CIRCUIT FOR TWO SWITCHING CONVERTER STAGES IN A VOLTAGE CONVERTER

(75) Inventors: Giovanni Capodivacca, Padua (IT); Maurizio Galvano, Raffadali (IT)

(73) Assignee: Infineon Technologies AG, Munich (DE)

( * ) Notice: Subject to any disclaimer, the term of this patent is extended or adjusted under 35 U.S.C. 154(b) by 67 days.

(21) Appl. No.: 11/336,643

(22) Filed: Jan. 19, 2006

(65) Prior Publication Data
US 2006/0197569 A1    Sep. 7, 2006

(30) Foreign Application Priority Data
Jan. 19, 2005   (DE)   ............ 10 2005 002 570

(51) Int. Cl.
*G05F 1/40*    (2006.01)
(52) U.S. Cl. .................................. 323/272
(58) Field of Classification Search ............... 323/224, 323/282, 283, 272
See application file for complete search history.

(56) References Cited
U.S. PATENT DOCUMENTS 5,638,264 A * 6/1997 Hayashi et al. ............ 363/65
5,808,453 A * 9/1998 Lee et al. .................. 323/224

FOREIGN PATENT DOCUMENTS

| EP | 1079508 A2 | 2/2001 |
|----|------------|--------|
| GB | 2012 501 A | 7/1979 |
| JP | 2000 156 970 | 6/2000 |
| WO | WO 02/19507 A2 | 3/2002 |

OTHER PUBLICATIONS

Tarter, Ralph E. *Solid-State Power Conversion Handbook*. New York: John Wiley & Sons, Inc. 1993 (p. 362).

* cited by examiner

*Primary Examiner*—Shawn Riley
(74) *Attorney, Agent, or Firm*—Maginot, Moore & Beck

(57) ABSTRACT

A drive circuit is disclosed including a first feedback circuit designed to generate a first feedback signal from a first voltage to be controlled and a first reference voltage. The drive circuit further includes a signal converter designed to generate a second feedback signal from the first feedback signal such that the difference between the first feedback signal and a first amplitude value of a periodic signal approximately matches the difference between the second feedback signal and a second amplitude value of the periodic signal. The drive circuit also includes a first pulse width modulator which receives the first feedback signal and the periodic signal and generates the first pulse width-modulated signal. In addition the drive circuit includes a second pulse width modulator which receives the second feedback signal and the periodic signal and generates the second pulse width-modulated signal.

20 Claims, 6 Drawing Sheets

DRIVE CIRCUIT FOR TWO SWITCHING CONVERTER STAGES IN A VOLTAGE CONVERTER

BACKGROUND

The invention refers to a drive circuit for two switching converter stages in a voltage converter.

Switching converters with different topologies are used for supplying a specified voltage to loads in a familiar adequate manner. The concept of connecting multiple switching converters in parallel in order to provide a large output current for a comparably low output voltage (as required for microprocessors in computers, for example) is well known. Voltage converters with switching converter stages connected in parallel are described, for example, in the publications GB 2 012 501 A or EP 1 079 508 A2. Switching converters with multiple converter stages of this nature are known as multi phase converters.

FIG. 1 illustrates a circuit diagram of a switching converter with two switching converter stages 10, 20. The two converter stages are designed in the example as buck converters, each with input terminals 11, 12, 21, 22 for applying an input voltage Vin, and output terminals 13, 14, 23, 24 for providing a regulated output voltage Vout for a load 2, depicted by dashes. The two converter stages 10, 20 are connected in parallel by connecting the first output terminals 13, 23 in a conductive manner, and connecting the second output terminals 14, 24—which are connected in the example to a reference potential GND—in a conductive manner.

Each of the two converter stages has an LC element with an inductor 16, 26 and a capacitor 17, 27, along with a first switch 15, 25 for clocked application of the input voltage Vin to the LC element. The common output voltage Vout of the converter stages 10, 20 is applied over the capacitors 17, 27. Each of the converter stages has a second switch 18, 28, which is driven complementary to the corresponding first switch 15, 25 by means of an inverter 19, 29, and which acts as a free-running element for the inductor 16, 26 with the first switch 15, 25 open.

The switches 15, 25 in the two converter stages are driven in each case by a pulse width-modulated drive signal PWM1', PWM2'. The power input of each of the converter stages 10, 20 varies with the duty cycle of the corresponding pulse width-modulated drive signal PWM1', PWM2'. With reference to FIG. 2, the duty cycle is determined by the quotient obtained from the activation period Ton1, Ton2 of the corresponding signal PWM1', PWM2' and its period Tp1, Tp2.

As described in Tarter: "Solid-State Power Conversion Handbook", page 362, John Wiley & Sons, 1993, ISBN 0-471-57243-8, it is an established practice to compare a control or feedback signal that varies with the output voltage to a saw-tooth signal in order to provide a pulse width-modulated drive signal for controlling the power input in a switching converter. A control signal of this kind obtained from the output voltage Vout using a voltage divider R1, R2 and a control amplifier or error amplifier 51 is marked by Vfb in FIG. 1.

In order, on the one hand, to minimize rippling of the output voltage Vout and, on the other hand, to place as distributed a load as possible on an input voltage source for supplying the input voltage Vin, it is beneficial if the switches 15, 25 in the individual converter stages 10, 20 are driven as conducting with a time delay between them. With reference to FIG. 2, this can be achieved by providing two saw-tooth signals Vr1, Vr2 with a phase shift of 180° between each signal for comparison with the feedback signal.

A basic objective when employing multiple converter stages connected in parallel is to drive the individual converter stages in such a way that each stage contributes in equal measure to supplying the load—i.e., so that they provide at least approximately equal output currents.

Assuming that the components of each of the converter stages 10, 20, particularly the LC elements, are identically dimensioned, it is crucial for equal current loading of the two converter stages 10, 20 that the pulse width-modulated drive signals PWM1', PWM2' have a large degree of similarity with regard to their duty cycles, as otherwise, if the duty cycle of one converter stage differs even slightly from the duty cycle of the other converter stage, the output currents of the two stages differ greatly. It can be mathematically demonstrated for a typical load on the voltage converter with a supply voltage of 2V and a current rating of 10 A that the difference in the output currents of the two converters 10, 20 is about 20% if the duty cycles of the two converters differ by just 1%, assuming a turn-on resistance of 10 mΩ for the two converters.

If the two converter stages 10, 20 are driven using phase shifting, the setting of an identical duty cycle for the two converter stages 10, 20 makes considerable demands when matching the two saw-tooth signals Vr1, Vr2.

Accordingly, it would be advantageous to provide a drive circuit for two switching converter stages in a voltage converter to generate two phase-shifted pulse width-modulated drive signals with identical duty cycles.

SUMMARY

A drive circuit for providing a first and second pulse width-modulated drive signal for two switching converter stages in a voltage converter comprises the following features:
- a first feedback circuit designed to generate a first feedback signal from a first voltage to be controlled and a first reference voltage,
- a signal generator designed to generate a periodic signal varying between two amplitude values,
- a signal converter designed to generate a second feedback signal from the first feedback signal in such a way that the difference between the first feedback signal and the first amplitude value of the periodic signal at least approximately matches the difference between the second feedback signal and the second amplitude value of the periodic signal,
- a first pulse width modulator which receives the first feedback signal and the periodic signal and which generates a first pulse width-modulated signal, and
- a second pulse width modulator which receives the second feedback signal and the periodic signal and which generates a second pulse width-modulated signal.

The signal generator is preferably designed to generate a periodic signal whose amplitude characteristic is symmetrical in respect of its mean value. This signal is triangular or sinusoidal in shape, for example.

The drive circuit of the invention uses only one periodic signal to generate the two pulse width-modulated drive signals. The two drive signals are shifted in phase with respect to one another in that the first drive signal is generated by comparing the periodic signal with the first feedback signal and the second drive signal by comparing the periodic signal with the second feedback signal.

In one embodiment of the drive circuit a second feedback circuit is used to generate an additional feedback signal from a second voltage to be controlled and a second reference voltage. The drive circuit in this particular embodiment also includes a switch connected prior to the second pulse width modulator. This switch is designed to feed the second feedback signal or the additional feedback signal to the second pulse width modulator in accordance with a converter signal. The drive circuit can be used to drive two switching converter stages connected in parallel in a voltage converter—in this case, the second feedback signal is fed to the second pulse width modulator. Alternatively, the drive circuit can be used to drive two converter stages that are not connected in parallel and that generate differently controlled output voltages. In this case, the additional feedback signal which controls the output voltage generated by the second converter stage is fed to the second pulse width modulator.

The present invention is explained in greater detail using design examples.

Unless otherwise stated, the reference signs in the figures indicate the same circuit components and signals with the same meaning.

DESCRIPTION

Figure 1:
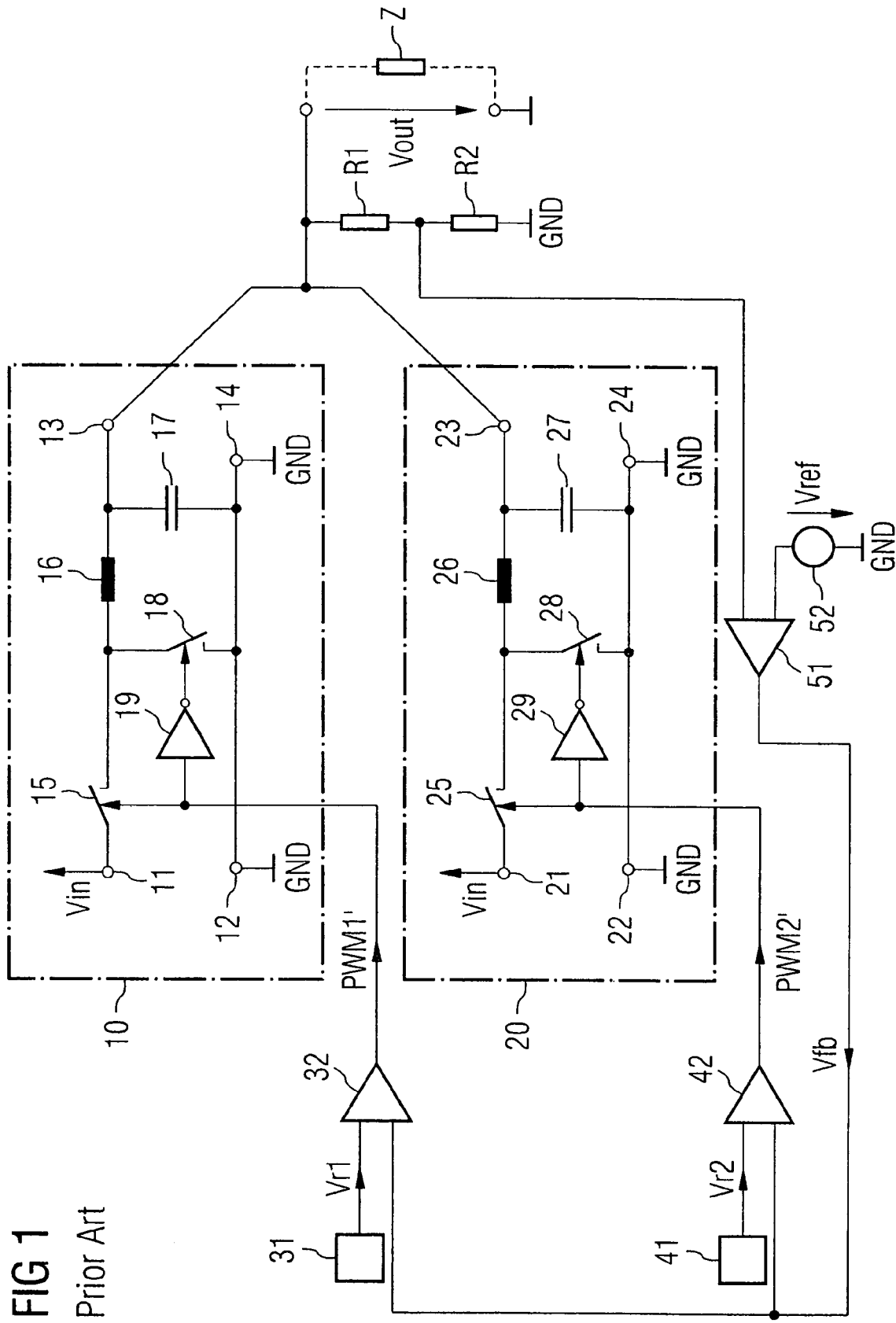
FIG. 1 shows a prior art voltage converter with two converter stages connected in parallel.
Figure 2:
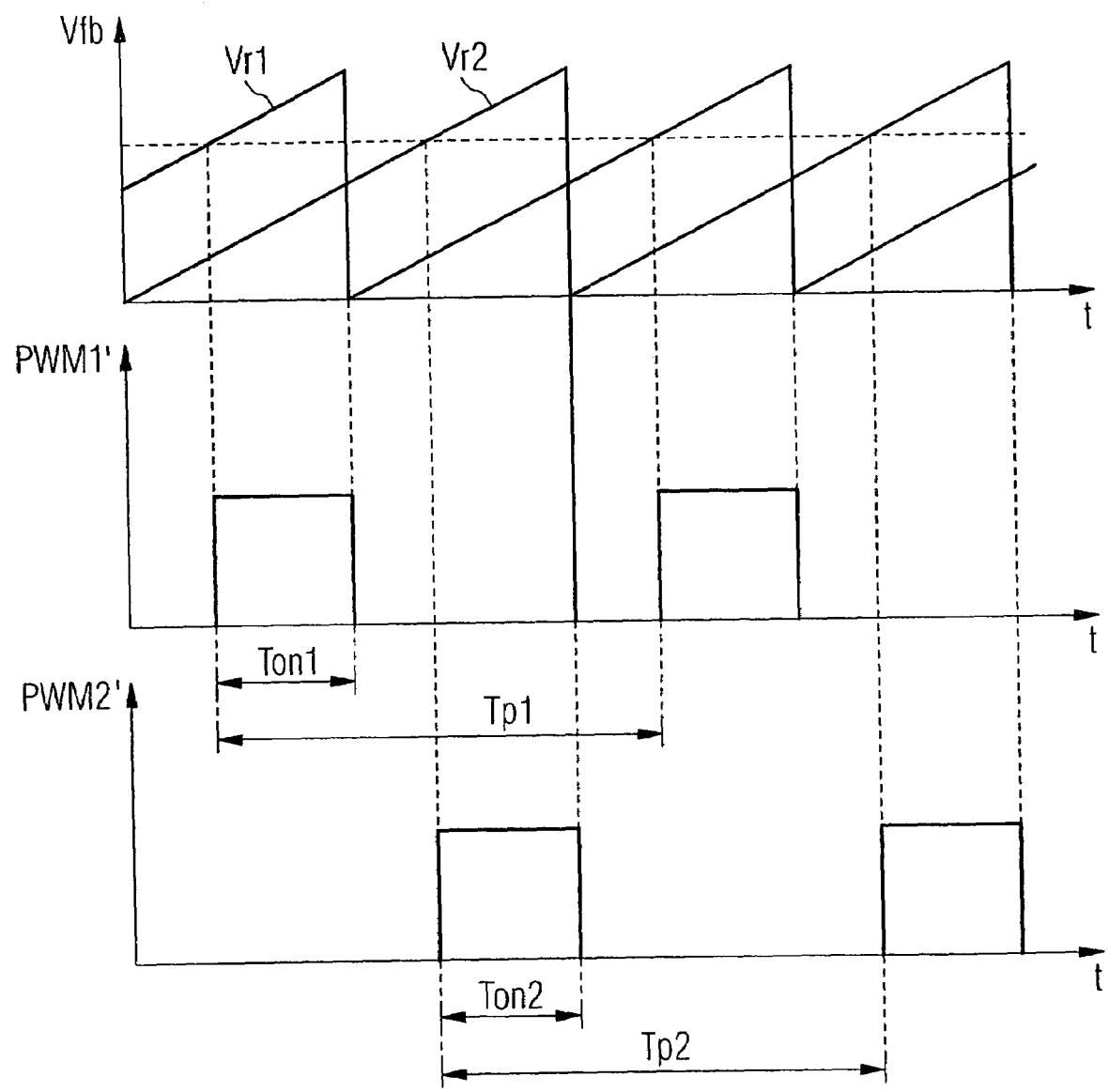
FIG. 2 illustrates the generation of phase-shifted pulse width-modulated drive signals for the converter stages shown in FIG. 1.
Figure 3:
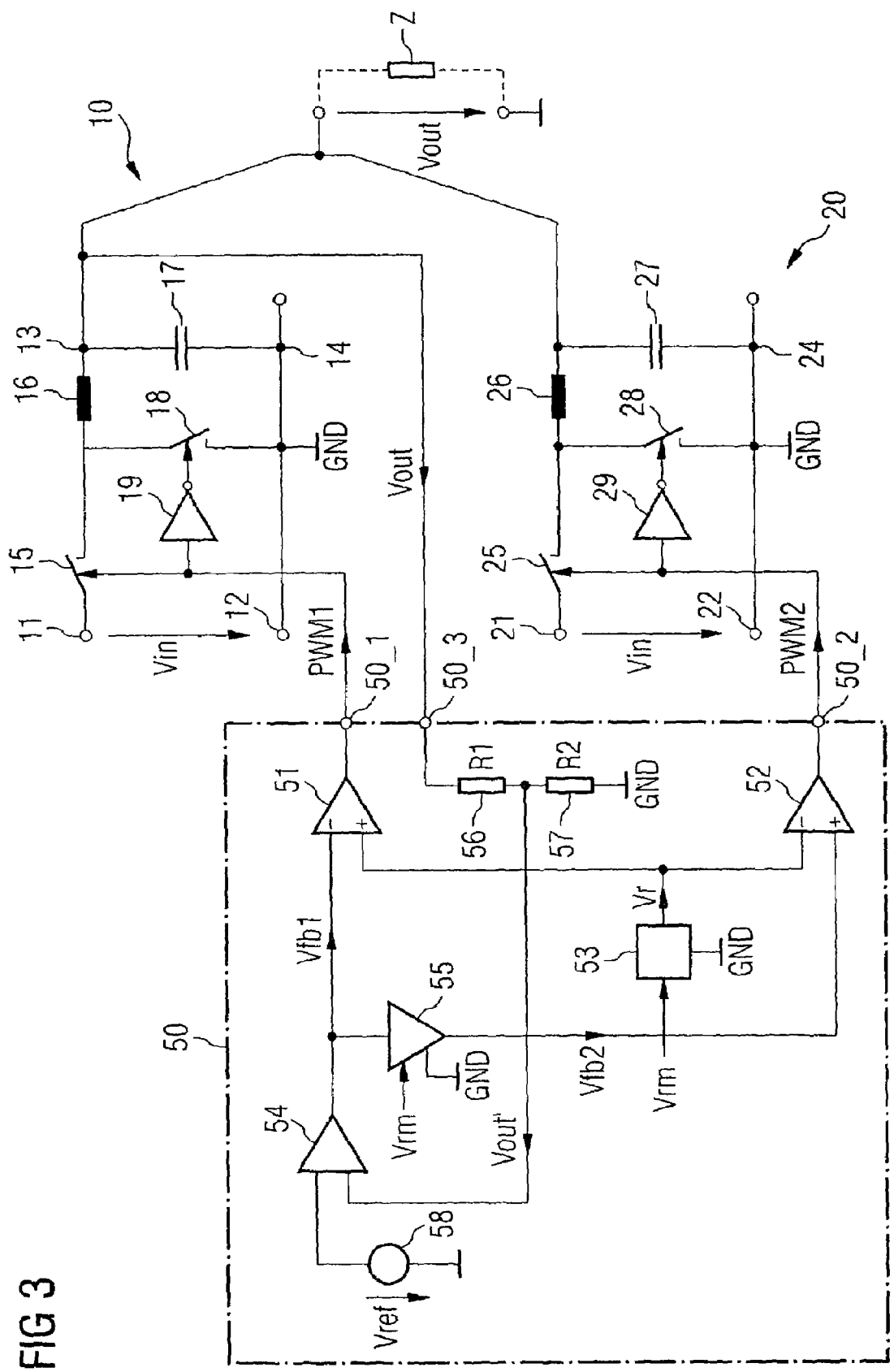
FIG. 3 shows a first embodiment of a drive circuit of the present invention for two switching converter stages connected in parallel in a voltage converter, which generates two phase-shifted pulse width-modulated drive signals.

FIG. 3 shows a first embodiment of a drive circuit of the invention for driving two switching converter stages 10, 20 in a voltage converter in a phase shifted manner phases. The drive circuit 50 provides two phase-shifted pulse width-modulated drive signals PWM1, PWM2, of which a first PWML is used to drive a first switching converter stage 10 and of which a second PWM2 is used to drive a second switching converter stage 20. For easier comprehension of the operation of the drive circuit 50, in addition to the drive circuit 50, FIG. 3 illustrates two switching converter stages 10, 20 connected in parallel. These two switching converter stages 10, 20 are each designed in the example as buck converters.

Each of the two switching converter stages 10, 20 has input terminals 11, 12 and 21, 22 respectively to apply an input voltage Vin and output terminals 13, 14 and 23, 24 respectively to provide an output voltage Vout. The output terminals are connected in parallel in order to supply the output voltage Vout to a load Z, depicted by dashes. Each of the converter stages 10, 20 has an LC element with an inductor 16, 26 and a capacitor 17, 27, along with a switch 15, 25 to connect the corresponding LC element to the input voltage Vin. The output voltage Vout can be tapped at the capacitors 17, 27. Another switch 18, 28 is connected in parallel to the LC element in each converter stage as a free-running element. Each switch is driven by means of an inverter 19, 29 complementary to the first switch 15, 25 in the corresponding converter stage. Each LC element is used in a typical manner as a low pass filter to provide the output voltage Vout from the voltage generated from the input voltage Vin through the first switch 15, 25 with a rectangular signal shape.

The first switches 15, 25 in the two converter stages are driven in each case by a pulse width-modulated signal PWM1, PWM2 generated by the drive circuit 50. The two pulse width-modulated drive signals PWM1, PWM2 are output at the first and second points 50_1, 50_2 of the drive circuit 50.

The drive circuit has a first feedback circuit for generating a first feedback signal Vfb1 from the output voltage Vout to be controlled and received at a terminal 50_3, taking the reference voltage Vref into consideration. A voltage divider 56, 57 for generating a smaller output voltage Vout' by division of the source output voltage Vout is connected to the connection point 50_3. This divided voltage Vout' is fed along with the reference voltage Vref to a control amplifier or error amplifier 54, which generates the first feedback signal Vfb1. The reference voltage Vref is used as a reference value for the divided output voltage Vout'; the reference value for the output voltage Vout then corresponds to the reference voltage Vref multiplied by the inverse value of the division ratio of the voltage divider 56, 57. Depending on the feedback behavior that is required, the control amplifier 54 exhibits proportional, integral or proportional-integral characteristics.

The drive circuit 50 also has a signal generator 53 designed to generate a periodic signal Vr, whose amplitude varies periodically between a first and second amplitude value. This signal is preferably symmetrical in respect of its mean value—for example, a signal with a triangular or sinusoidal waveform. A periodic signal is then symmetrical to its mean value with regard to the present invention if the characteristic of a signal obtained by mirroring the periodic signal through an axis defined by the mean value matches the characteristic of the periodic signal but is only shifted in phase.

The drive circuit 50 also has a signal converter 55, used to generate a second feedback signal Vfb2 from the first feedback signal Vfb1 in such a way that the difference between the first feedback signal Vfb1 and the first amplitude value Vrm of the periodic signal matches at least approximately the difference between the second feedback signal Vfb2 and the second amplitude value GND of the periodic signal Vr. These first and second amplitude values Vrm and GND respectively—from which the signal generator 53 generates the periodic signal Vr—are likewise input into the signal converter 55. In the example shown, the second amplitude value corresponds to a reference potential GND to which all voltages in the drive circuit 50 refer.

Figure 4:
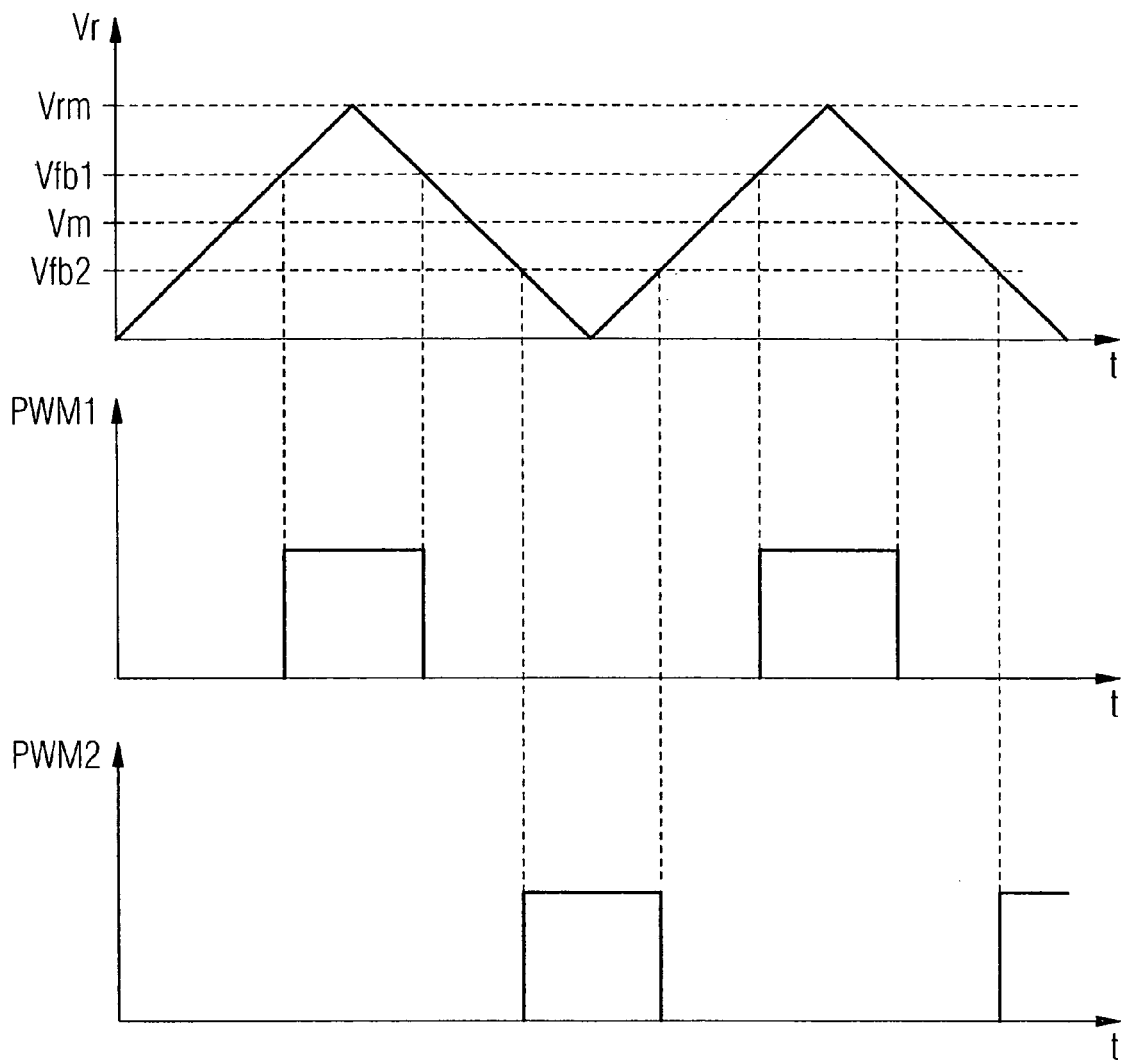
FIG. 4 illustrates the generation of the drive signals by the drive circuit of FIG. 3.

To generate the pulse width-modulated drive signals PWM1, PWM2, the drive circuit 50 has a first and a second pulse width modulator 51, 52, to which the periodic signal Vr is fed. Apart from the periodic signal Vr, the first feedback signal Vfb1 is fed to the first pulse width modulator 51; along with the periodic signal Vr, the second feedback signal Vfb2 is fed to the second pulse width modulator 52. The two pulse width modulators 51, 52 are implemented as comparators in the example. To generate the first pulse width-modulated drive signal PWM1, the first pulse width modulator 51 compares the first feedback signal Vfb1 with the periodic signal Vr and produces an activation level (on level) for the first drive signal PWM1 whenever the periodic signal Vr is above the first feedback signal Vfb1. To generate the second pulse width-modulated drive signal PWM2, the second pulse width modulator 52 compares the periodic signal Vr with the second feedback signal Vfb2 and produces an activation level for the second drive signal PWM2 whenever the periodic signal Vr is below the second feedback signal Vfb2. For a periodic signal Vr that is symmetrical in respect of the mean value, it is assured for the drive circuit that the activation levels of the two pulse width-modulated signals are generated with a phase shift, and that the two pulse width-modulated signals PWM1, PWM2 have the same duty cycle as explained below using FIG. 4.

It is assumed for the explanation that the periodic signal Vr is a signal with a triangular waveform whose amplitude varies between the first amplitude value Vrm, which is the maximum value in the example, and the second amplitude value GND, which is the minimum value in the example. The triangles in the signal's waveform need not necessarily have equal angles—in other words, the times for rising edges must not necessarily match the times for falling edges. In connection with this invention, all triangular signal waveforms up to and including saw-tooth patterns are understood to be triangular. As explained, the second feedback signal Vfb2 is generated from the first feedback signal Vfb1 in such a way that the difference between the first amplitude value Vrm and the first feedback signal Vfb1 matches the difference between the second feedback signal Vfb2 and the second amplitude value GND. This is expressed as follows:

$$|Vrm - Vfb1| = |Vfb2 - GND| \qquad (1).$$

For a periodic signal whose waveform is symmetrical with regard to its mean value, the equation 1 shown above can be alternatively expressed as saying that the two feedback signals Vfb1, Vfb2 are selected in such a way that they are symmetrical to this mean value. This mean value is designated in FIG. 4 as Vm. The following relationship then applies:

$$|Vfb1 - Vm| = |Vm - Vfb2| \qquad (2).$$

An activation signal for the first pulse width-modulated signal PWMI is generated if the amplitude of the periodic signal Vr is greater than the feedback signal Vfb1. Analogously, an activation signal for the second pulse width modulated drive signal PWM2 is generated if the amplitude of the periodic signal Vr is less than the feedback signal Vfb2. Assuming that the periodic signal Vr is symmetrical with regard to its mean value Vm and that the two feedback signals Vfb1, Vfb2 are symmetrical about this mean value, then the two pulse width-modulated signals PWM1, PWM2 are shifted 180° in phase from each other and also have the same duty cycles.

Key to the matching of the duty cycles of the two pulse width-modulated signals PWM1, PWM2 is the generation of the second feedback signal Vfb2 from the first feedback signal Vfb1.

Figure 5:
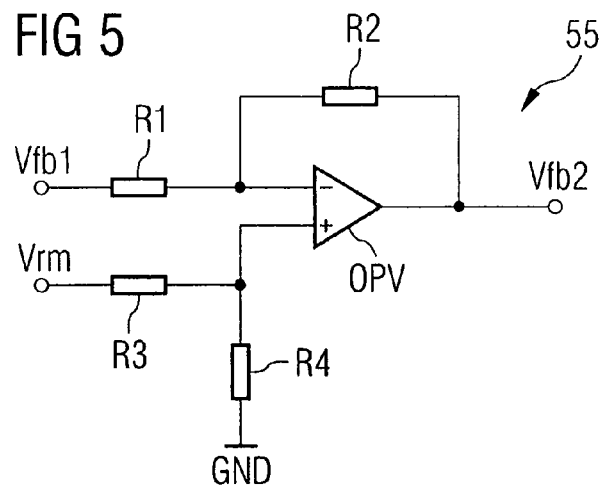
FIG. 5 shows an example of a circuit for implementing a signal converter used in the drive circuit.

FIG. 5 illustrates an example of a circuit for realization of the signal converter 55, which generates the second feedback signal Vfb2 from the first feedback signal Vfb1 with consideration of the equations (1) and (2). The signal converter 55 has an operational amplifier OPV, which is connected externally by four resistors R1-R4. The first feedback signal Vfb1 is input into the minus input of the operational amplifier OPV through a first resistor R1. The minus input and the output of the operational amplifier OPV, at which the second feedback signal Vfb2 is provided, are connected together through a second resistor R2. The plus input of the operational amplifier OPV is connected to the centre tap of a voltage divider formed by a third and fourth resistor R3, R4, in which the first amplitude value Vrm is at the first connection of the voltage divider, and the second amplitude value GND is at the second connection of the voltage divider. The resistors R1-R4 preferably have identical resistance values—but it is also sufficient for the first and second resistors R1, R2 to have identical resistances, and the third and fourth resistors R3, R4 to also have identical resistances. With identical resistance values for the third and fourth resistors R3, R4, the voltage between the plus input of the operational amplifier OPV and the reference potential GND matches the mean value Vm of the periodic signal Vr. The operational amplifier OPV sets its output current to a level such that the voltage between the minus input and reference potential GND also matches the mean value Vm. Assuming that the first and second resistors R1, R2 each have the same resistance, equation (2) explained above applies to the first and second feedback signals Vfb1, Vfb2.

Figure 6:
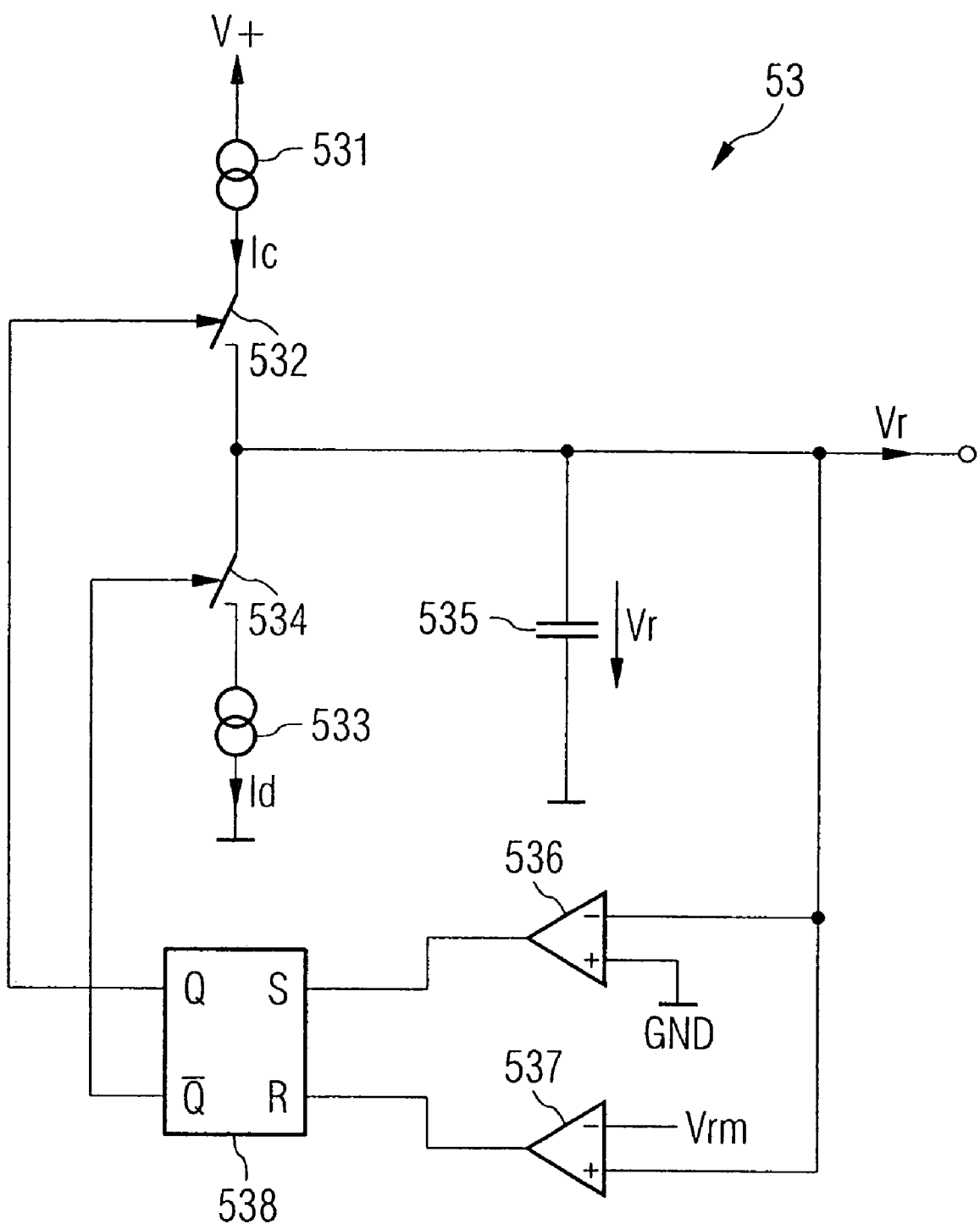
FIG. 6 shows an example of a circuit for implementing a signal generator used in the drive circuit to generate a triangular signal.

As explained, the duty cycles of the two pulse width-modulated signals PWM1, PWM2 match exactly if equation (2) is adhered to rigidly. Deviations occur if the first and second resistors R1, R2 and the third and fourth resistors R3, R4 are not exactly matched to each other. Maximum differences of 0.1% in the resistance values of these resistors can be easily reached. It can be demonstrated if the first and second resistors R1, R2 differ by 0.1% from each other, and if the third and fourth resistors R3, R4 differ by 0.1%, that the resulting difference in the duty cycles of the first and second pulse width-modulated signals PWM1, PWM2 is only about 0.07%. With relatively simple resources, the drive circuit of the invention enables phase-shifted pulse width-modulated drive signals to be generated with duty cycles that only differ slightly from each other, even under consideration of production-related variations in the components used in the signal converter 55. Conventional triangular signal generators can be used to create the triangular-shaped periodic signal Vr. FIG. 6 shows an example of such a triangular signal generator: it has a capacitor 535 holding the triangular-shaped voltage Vr, and a charging current source 531 and discharging current source 533. The charging current source 531 is connected through a first switch 532 to the capacitor 535, and the discharging current source 533 is connected through a second switch 534 to the capacitor 535. The two switches 532, 534 are driven complementary to each other by means of a flip-flop 538. When the first switch 532 is closed, the capacitor 535 is charged by the first current source 531 with a constant charging current Ic. The voltage Vr rises linearly as a result—the steepness of the voltage characteristic varies with the charging current Ic and the capacitance value of the capacitor 535. A first comparator 537 compares the voltage Vr at the capacitor 535 with the maximum value Vrm and resets the flip-flop 538 when the voltage Vr at the capacitor 535 reaches the maximum value Vrm. When the flip-flop 538 is reset, the first switch 532 opens and the second switch 534 closes.

If the second switch 534 is closed, the capacitor 535 is discharged with a constant discharging current Id by means of the second current source 533—the voltage at the capacitor 535 decreases linearly. If the value of the discharging current Id matches that of the charging current Ic, the steepness of the falling edge matches the steepness of the rising edge of the characteristic of the voltage Vr at the capacitor 535. The discharging is completed when the voltage Vr reaches the minimum value GND. A second comparator 536 compares the voltage Vr with the minimum value GND and sets the flip-flop 538 when the voltage Vr drops to the minimum value GND. When the flip-flop is set, the first switch 532 is closed and the second switch 534 is opened, which causes renewed charging of the capacitor 535.

Figure 7:
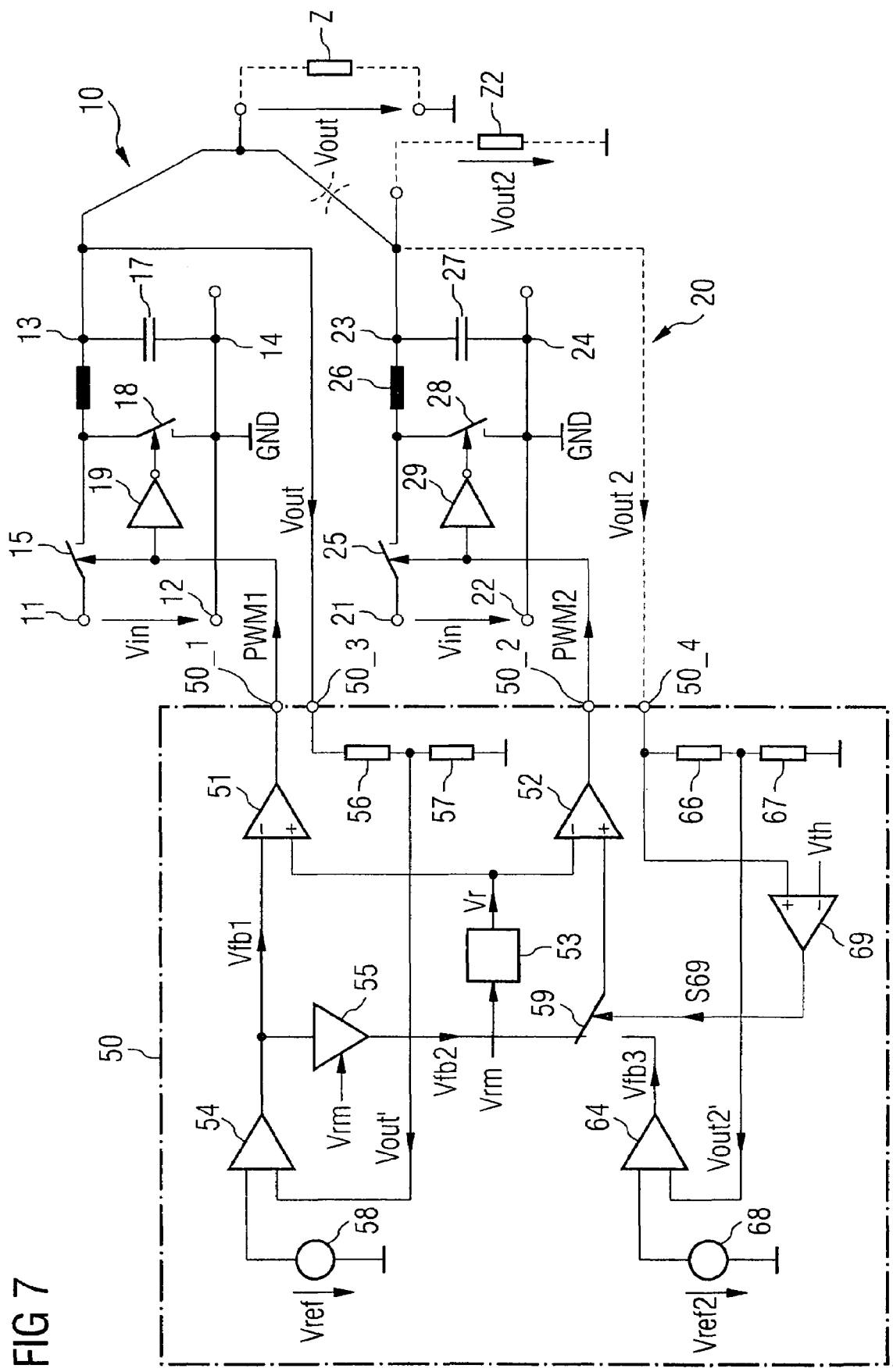
FIG. 7 shows a second embodiment of a drive of the present invention for optionally generating either two drive signals for converter stages connected in parallel or for separate converter stages.

FIG. 7 shows an example of an embodiment of a drive circuit 50 as claimed in the invention, which is suitable both for driving two switching converter stages connected in parallel in a voltage converter and for driving two switching converter stages operating independently of each other.

This driver circuit 50 has an additional terminal 50_4 for routing a second voltage to be controlled Vout2 and a second feedback circuit for providing an additional feedback signal Vfb3. This second feedback circuit comprises a voltage divider 66, 67 connected to the additional terminal point 50_4 for providing a smaller output voltage Vout2' by voltage division, and a control amplifier 64, which generates the additional feedback signal Vfb3 according to a second reference voltage Vref2 and the voltage signal obtained by voltage division Vout2'. A switch 59 is connected prior to the second pulse width modulator 52, which generates the second pulse width-modulated signal PWM2. The switch 59 optionally routes either the second feedback signal Vfb2 generated by the second signal converter 55 or the additional feedback signal Vfb3 generated by the second feedback circuit 64, 66, 67 to the second pulse width modulator 52. The switch 59 is driven by a comparator 69 in accordance with a comparison made between a voltage at the additional terminal 50_4 and a threshold value Vth. If the voltage at the additional terminal 50 4 is lower than the threshold value Vth, the second feedback signal Vfb2 is fed to the second pulse width modulator 52. If the voltage at the additional terminal 50_4 is higher than the threshold value Vth, the additional feedback signal Vfb3 is fed to the second pulse width modulator 52.

The operating mode of this drive circuit 50 can therefore be set using the outer configuration at the connection point 50_4. If there is no voltage at the terminal 50_4, two phase-shifted pulse width-modulated drive signals PWM1, PWM2 are generated with the same duty cycles—these duty cycles are suitable for driving identically designed switching converter stages connected in parallel. The outer configuration of the drive circuit 50 with two switching converter stages connected in parallel is illustrated in FIG. 7 with full lines.

The dashed lines in FIG. 7 represent an outer configuration of the drive circuit 50 in which the two switching converter stages 10, 20 are not connected in parallel. Rather, the first switching converter stage 10 is used to supply the load Z, while the second switching converter stage 20 supplies an additional load Z2. The output voltage Vout fed to the third terminal 50_3 is only the output voltage of the first switching converter stage 10 in this case. This first switching converter stage 10 is driven in this operating mode by the first pulse width-modulated signal PWM1 generated by the first feedback circuit 54, 56, 57 and the first pulse width modulator 51 to regulate the output voltage Vout to the reference value dependent on the reference voltage Vref.

In this operating mode, the output voltage Vout2 of the second switching converter stage 20 is fed to the additional terminal 50_4. The second switching converter stage 20 is driven by a pulse width-modulated signal in this operating mode from the second feedback circuit 64, 66, 67 and the second pulse width modulator 52 in such a way that an output voltage Vout2 is obtained which varies with the second reference voltage Vref2.

REFERENCE SIGNS

GND reference potential
Ic charging current
Id discharging current
OPV operational amplifier
PWM1', PWM2' pulse width-modulated drive signals
R1 . . . R4 resistors
R1, R2 voltage dividers
Vfb feedback signal, control signal
Vfb3 feedback signal
Vin input voltage
Vout output voltage
Vout2 output voltage
Vr periodic signal
VR1, VR2 saw-tooth signals
Vref reference voltage
Vref reference voltage
Vref2 reference voltage
Vrm first amplitude value or maximum value of the periodic signal
Vth threshold value
Z load
Z2 load
10 first switching converter stage
15 first switch in the first switching converter stage
16 inductance of the first switching converter stage
17 capacitance of the first switching converter stage
18 second switch in the first switching converter stage
19 inverter in the first switching converter stage
20 second switching converter stage
11, 12 input terminals in the first switching converter stage
25 first switch in the second switching converter stage
26 inductance of the second switching converter stage
13, 14 output terminals in the first switching converter stage
27 capacitance of the second switching converter stage
28 second switch in the second switching converter stage
29 inverter in the second switching converter stage
21, 22 input terminals in the second switching converter stage
23, 24 output terminals in the second switching converter stage
50 drive circuit
51 control amplifier
52 reference voltage source
53 signal generator
54 control amplifier
55 signal converter
58 reference voltage source
64 control amplifier, error amplifier
68 reference voltage source
69 comparator
31, 41 saw-tooth generators
32, 42 pulse width modulators
50 1 . . . 50_4 connections of the drive circuit
51, 52 pulse width modulators
56, 57 voltage dividers
66, 67 voltage dividers
535 capacitor
538 flip-flop
531, 533 current sources 532, 534 switches
536, 537 comparators

The invention claimed is:

1. A drive circuit for providing two pulse width-modulated drive signals for switching converter stages in a voltage converter, the drive circuit comprising:
   a first feedback circuit configured to generate a first feedback signal from a first voltage to be controlled and from a first reference voltage;
   a signal generator configured to provide a periodic signal with an amplitude varying between a first amplitude value and a second amplitude value;
   a signal converter configured to generate a second feedback signal from the first feedback signal in such a way that the difference between the first feedback signal and the first amplitude value of the periodic signal at least approximately matches the difference between the second feedback signal and the second amplitude value of the periodic signal;
   a first pulse width modulator configured to receive the first feedback signal and the periodic signal and generate a first pulse width-modulated signal; and
   a second pulse width modulator configured to receive the second feedback signal and the periodic signal and generate a second pulse width-modulated signal.

2. The drive circuit of claim 1 wherein the signal generator is configured to generate a periodic signal whose amplitude is symmetrical in respect of its mean value.

3. The drive circuit of claim 1 wherein the periodic signal has a triangular waveform.

4. The drive circuit of claim 1 wherein the periodic signal has a sinusoidal waveform.

5. The drive circuit of claim 1 wherein the first amplitude value is a maximum amplitude value and the second amplitude value is a minimum amplitude value, wherein the first pulse width modulator is configured to generate an activation level for the first pulse width-modulated signal whenever the periodic signal is higher than the first feedback signal, and wherein the second pulse width modulator is configured to generate an activation level for the second pulse width-modulated signal whenever the periodic signal is lower than the second feedback signal.

6. The drive circuit of claim 1 further comprising a second feedback circuit configured to generate a further feedback signal from a second voltage to be controlled and a second reference voltage.

7. The drive circuit of claim 6 further comprising a switch connected prior to the second pulse width modulator, the switch configured to switch the second feedback signal or the further feedback signal to the second pulse width modulator in accordance with a switching signal.

8. The drive circuit of claim 7 further comprising a first input configured to receive the first voltage to be controlled, a second input configured to receive the second voltage to be controlled, and a threshold detector connected to the second input and configured to provide the switching signal by comparing the second voltage to be controlled with a threshold value.

9. The drive circuit of claim 6 wherein the second feedback circuit exhibits proportional, integral or proportional-integral characteristics.

10. The drive circuit of claim 1 wherein the first feedback circuit exhibits proportional, integral or proportional-integral characteristics.

11. A drive circuit for providing two pulse width-modulated drive signals to a voltage converter, the voltage converter including a first switching converter stage providing a first output voltage and a second switching converter stage providing a second output voltage, the drive circuit comprising:
   a first feedback circuit configured to provide a first feedback signal from the first output voltage and from a first reference voltage;
   a first pulse width modulator configured to provide a first pulse width-modulated signal, the first pulse width modulator configured to receive the first feedback signal and a periodic signal having an amplitude varying between a first amplitude value and a second amplitude value;
   a signal converter configured to provide a second feedback signal from the first feedback signal in such a way that the difference between the first feedback signal and the first amplitude value of the periodic signal substantially matches the difference between the second feedback signal and the second amplitude value of the periodic signal; and
   a second pulse width modulator configured to provide a second pulse width-modulated signal, the second pulse width modulator configured to receive the second feedback signal and the periodic signal.

12. The drive circuit of claim 11 wherein the periodic signal comprises an amplitude that is symmetrical in respect of its mean value.

13. The drive circuit of claim 11 wherein the periodic signal comprises a triangular waveform.

14. The drive circuit of claim 11 wherein the periodic signal comprises a sinusoidal waveform.

15. The drive circuit of claim 11 wherein the first amplitude value is a maximum amplitude value and the second amplitude value is a minimum amplitude value, wherein the first pulse width modulator is configured to generate an activation level for the first pulse width-modulated signal whenever the periodic signal is higher than the first feedback signal, and wherein the second pulse width modulator is configured to generate an activation level for the second pulse width-modulated signal whenever the periodic signal is lower than the second feedback signal.

16. The drive circuit of claim 11 further comprising a second feedback circuit configured to generate a further feedback signal from the second output voltage and a second reference voltage.

17. The drive circuit of claim 16 further comprising a switch connected prior to the second pulse width modulator, the switch configured to switch the second feedback signal or the further feedback signal to the second pulse width modulator in accordance with a switching signal.

18. The drive circuit of claim 17 wherein the first output voltage is subjected to a first voltage divider between a first input of the drive circuit and the first feedback circuit, and the second output voltage is subjected to a second voltage divider between a second input of the drive circuit and the second feedback circuit.

19. The drive circuit of claim 18 further comprising a threshold detector connected to the second input and configured to provide the switching signal by comparing the second output voltage with a threshold value.

20. A drive circuit configured to provide phase-shifted pulse width-modulated drive signals with identical duty cycles, the drive circuit comprising:
   means for generating a first feedback signal from a first voltage to be controlled and from a first reference voltage;

means for providing a periodic signal with an amplitude varying between a first amplitude value and a second amplitude value;

means for generating a second feedback signal from the first feedback signal in such a way that the difference between the first feedback signal and the first amplitude value of the periodic signal substantially matches the difference between the second feedback signal and the second amplitude value of the periodic signal;

a first pulse width modulator configured to receive the first feedback signal and the periodic signal and generate a first pulse width-modulated signal; and a second pulse width modulator configured to receive the second feedback signal and the periodic signal and generate a second pulse width-modulated signal.

* * * * *